March 24, 1936.  H. J. HORN  2,034,947

WHEEL RIM

Filed June 24, 1935

INVENTOR.
HARRY J. HORN
BY
Carroll R. Taber
ATTORNEY.

Patented Mar. 24, 1936

2,034,947

UNITED STATES PATENT OFFICE 2,034,947

WHEEL RIM

Harry J. Horn, Lansing, Mich., assignor to Motor Wheel Corporation, Lansing, Mich., a corporation of Michigan Application June 24, 1935, Serial No. 28,066

8 Claims. (Cl. 152—21)

This invention relates to vehicle wheel rims of the character employing a detachable tire retaining flange at one edge thereof in the form of an endless ring and more particularly to the type of rim including a gutter at one edge thereof for the reception of a portion of the tire retaining flange. The principal object of this invention is the provision of a detachable means for locking the tire retaining flange in position on the rim. The means for locking the flange in position takes the form of a retention device adapted to be inserted into the gutter through a wall thereof.

An illustrative embodiment of the invention appears in the accompanying drawing, wherein.

Figure 3:
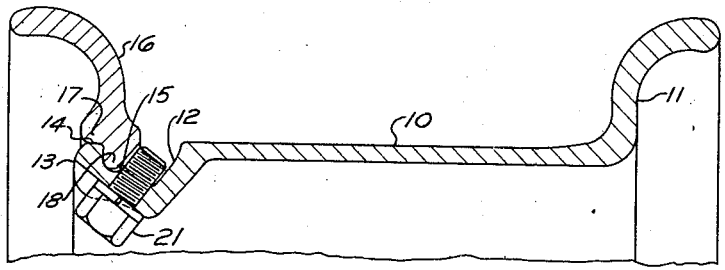
Figure 3 is an enlarged sectional view taken on substantially the line 3—3 of Figure 2.

The preferred embodiment of the invention is shown in Figure 3. The rim there shown includes an annular tire seat 10 having an integral tire retaining flange 11 at one edge thereof and a gutter 12 at the other edge. The outer wall 13 of gutter 12 has a radial inner surface which terminates at its periphery in a flange seat 14 lying in the same plane as the tire seat 10. Gutter 12 preferably includes a shoulder 15 as shown.

A detachable tire retaining flange 16 in the form of an endless ring is adapted to be mounted on the flange seat 14. Flange 16 is formed with a shoulder 17 to engage seat 14 and an inner portion 18 adapted to extend into gutter 12 along side the radial surface of wall 13.

The internal diameter of flange 16 is always less than the external diameter of flange seat 14 and is preferably less than the distance from seat 14 to the bottom of gutter 12 at diametrically opposite points of the rim. Flange 16 is accordingly provided with relieved portions 19 at diametrically opposite sides thereof to facilitate the mounting of the same upon its seat 14. A slot 20 is provided in portion 18 of flange 16 adjacent one of the relieved portions 19, for the insertion of a prying tool used in seating and removing the flange. To install flange 16 the inner edge 18 at one side thereof is placed in the bottom of gutter 12 and the flange then may be stretched sufficiently (with the aid of relieved portions 19) to permit the inner portion 18 around the remainder of the flange to pass over the flange seat 14. The flange is then adjusted with shoulder 17 mounted on seat 14.

In use flange 16 is installed only after a tire has been mounted on the rim seat and before the tire is inflated. When the tire is inflated it serves to hold flange 16 properly on its seat 14 with portion 18 contacting the radial surface of wall 13. However, in case of a puncture or other inadvertent deflation of the tire, flange 16 tends to leave its seat and one edge thereof drops down into the bottom of gutter 12. Under such circumstances if the rim is in motion, the flange may be completely dislodged from the rim. Shoulder 15 in gutter 12 helps to eliminate this difficulty by preventing, to some extent, the initial dislodgment of the flange from its seat 14.

Figure 1:
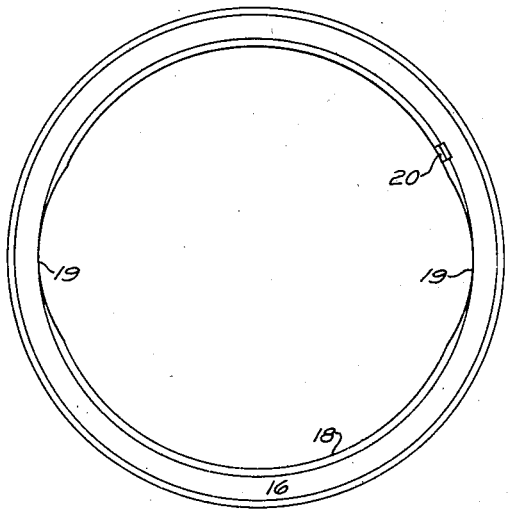
Figure 1 is a side view of a tire retaining flange in the form of an endless ring.
Figure 2:
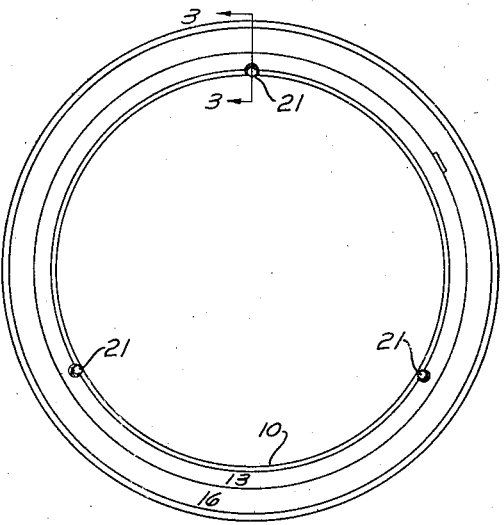
Figure 2 is a side view of a rim having the flange of Figure 1 mounted thereon.

It is the principal object of this invention to prevent such dislodgment of flange 16 under all circumstances. To that end, as shown in Figure 3, the wall 13 is provided at spaced intervals with screw threaded openings for the reception of locking screws 21. Three of these screws are preferably employed arranged as shown in Figure 2. Screws 21 are inserted or screwed home after flange 16 has been properly mounted on its seat. The threaded shank of the screw is long enough to project beyond the inner periphery of portion 18 of flange 16 yet short enough to remain within the confines of gutter 12. Thus the inner portion 18 of the flange is locked between the radial surface of wall 13 and the screws 21 and the flange positively secured against dislodgment from its seat 14.

Figure 4:
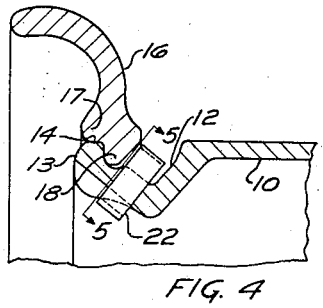
Figure 4 is a fragmentary enlarged sectional view similar to that of Figure 3 illustrating a modified form of locking device.
Figure 5:
Figure 5 is a sectional view taken on substantially the line 5—5 of Figure 4.

In the modification illustrated in Figures 4 and 5 the openings in the wall 13 of gutter 12 are not threaded. A resilient clip 22, having legs spaced apart at their free extremities, is inserted into these openings by pressing the legs together. After insertion the legs spring apart as shown in Figure 5 firmly securing the device in position.

As in the case of screws 21, the legs of clip 22 are long enough to substantially fill the unoccupied portion of gutter 12 for a limited part of its radial extent. Thus, flange 16 is securely locked in position on its seat. Of course, clips 22 must be withdrawn before flange 16 can be removed from the rim. This is also true of screws 21.

Figure 6:
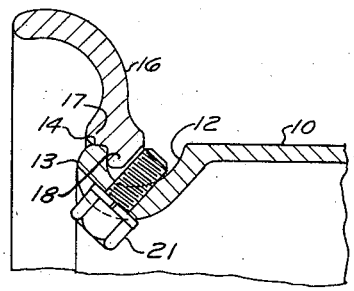
Figure 6 is a fragmentary sectional view corresponding to that of Figure 3 illustrating a slightly modified form of rim base and gutter construction.

The construction illustrated in Figure 6 is identical to that shown in Figure 3 except for the omission of shoulder 15. In this form of construction the screw 21 is the sole means for maintaining flange 16 upon its seat. The elimination of shoulder 15 is an additional advantage made possible by the present invention.

Various modifications in addition to those shown and described may be employed without departing from the spirit or scope of the present invention as defined by the appended claims.

I claim:

1. A wheel rim comprising an annular tire seat having a gutter at one edge thereof, a tire retaining flange in the form of an endless ring mounted on said rim with a portion extending into the gutter, the internal diameter of the flange being less than the distance from the top of the gutter at one side of the rim to the bottom of the gutter at the diametrically opposite side of the rim, and means adapted to be inserted into the gutter through a wall thereof to substantially fill the unoccupied portion of the gutter throughout a limited portion of the circumferential extent thereof.

2. A wheel rim comprising an annular tire seat having a gutter at one edge thereof, a detachable tire retaining flange mounted on the rim with a portion thereof extending into the gutter, and means adapted to be inserted into the gutter through a wall thereof for locking the flange in position.

3. A wheel rim comprising an annular tire seat having a gutter of uniform depth at one edge thereof, the outer wall of said gutter forming a ring seat, a tire retaining ring mounted on said seat with a portion thereof extending into the gutter but terminating short of the bottom of the gutter, and means adapted to be inserted into the gutter from the exterior of the rim after the ring has been mounted to prevent the ring from dropping to the bottom of the gutter.

4. A wheel rim comprising an annular tire seat having a gutter at one edge thereof, the outer wall of said gutter being of substantially uniform radial extent throughout its circumference, a side ring mounted on the rim with a flange portion extending into said gutter, and removable means adapted to be inserted into the gutter from the exterior of the rim after the ring has been mounted upon the rim to lock the ring in position.

5. A wheel rim comprising an annular tire seat having a gutter at one edge thereof, the outer wall of said gutter being of substantially uniform radial extent throughout its circumference, a side ring mounted on the rim with a flange portion extending into said gutter and terminating short of the bottom of the gutter, and removable means adapted to be inserted into the gutter beneath said flange to prevent the flange from dropping to the bottom of the gutter.

6. A wheel rim comprising an annular tire seat having a gutter at one edge thereof, a side ring adapted to be mounted on the rim with a continuous annular portion thereof extending into the gutter, the internal diameter of said side ring being less than the distance from the top of the gutter at one side of the rim to the bottom of the gutter at the opposite side of the rim, and means adapted to be inserted into the gutter from the exterior of the rim after the ring has been mounted to lock the ring in position on the rim.

7. A wheel rim comprising an annular tire seat having a flange receiving gutter at one edge thereof, the outer wall of said gutter being of substantially uniform radial extent throughout its circumference and forming a ring seat at its periphery, a side ring mounted upon said outer wall with a flange portion extending into said gutter, and removable means adapted to be inserted into the gutter in contact with said flange to lock said ring in position on its seat.

8. A wheel rim comprising an annular tire seat having a gutter at one edge thereof, a tire retaining ring mounted on the rim with a continuous annular portion thereof extending into said gutter, and means adapted to be inserted into the gutter from the exterior of the rim after the ring has been mounted to prevent the ring from dropping to the bottom of the gutter.

HARRY J. HORN.